(12) United States Patent
Aoki et al.

(10) Patent No.: US 10,156,495 B2
(45) Date of Patent: Dec. 18, 2018

(54) VIBRATION GENERATOR

(71) Applicant: IMV CORPORATION, Osaka-shi, Osaka (JP)

(72) Inventors: Hidenao Aoki, Osaka (JP); Katsuhiko Nakamura, Osaka (JP); Kazushi Nakanishi, Osaka (JP)

(73) Assignee: IMV CORPORATION, Osaka (JP)

( * ) Notice: Subject to any disclaimer, the term of this patent is extended or adjusted under 35 U.S.C. 154(b) by 89 days.

(21) Appl. No.: 15/305,897

(22) PCT Filed: Mar. 27, 2015

(86) PCT No.: PCT/JP2015/059642
§ 371 (c)(1),
(2) Date: Oct. 21, 2016

(87) PCT Pub. No.: WO2015/163085
PCT Pub. Date: Oct. 29, 2015

(65) Prior Publication Data
US 2017/0052089 A1    Feb. 23, 2017

(30) Foreign Application Priority Data

Apr. 22, 2014 (JP) .................. 2014-088382

(51) Int. Cl.
| | |
|---|---|
| *G01M 7/02* | (2006.01) |
| *G01M 7/04* | (2006.01) |
| *G01M 7/06* | (2006.01) |
| *G01M 7/08* | (2006.01) |

(52) U.S. Cl.
CPC ................... *G01M 7/02* (2013.01)

(58) Field of Classification Search
CPC .......... G01M 7/00; G01M 7/02; G01M 7/022; G01M 7/027; G01M 7/04; G01M 7/06; G01M 7/08; F16C 11/06
USPC .................................................. 73/662–669
See application file for complete search history.

(56) References Cited

U.S. PATENT DOCUMENTS

| | | | |
|---|---|---|---|
| 5,343,752 A | 9/1994 | Woyski et al. | |
| 5,544,528 A | 8/1996 | Woyski et al. | |
| 5,549,005 A * | 8/1996 | Aoki ....................... | G01M 7/04 73/663 |

(Continued)

FOREIGN PATENT DOCUMENTS

JP            3260756 B2    2/2002

*Primary Examiner* — Manish S Shah
*Assistant Examiner* — Suman K Nath
(74) *Attorney, Agent, or Firm* — Brinks Gilson & Lione (57) ABSTRACT

A vibration generator includes a region including a first base plate structural element and a second base plate structural element. A first flow-passage-forming element is provided between the first base plate structural element and the second base plate structural element. The first flow-passage-forming element includes a first vertical flow passage and a horizontal flow passage. The first vertical flow passage supplies oil to a bottom face of the first base plate structural element and a bottom face of the second base plate structural element. The horizontal flow passage supplies oil to one of the side faces of the first base plate structural element and one of the side faces of the second base plate structural element opposite this one of the side faces of the first base plate structural element.

15 Claims, 10 Drawing Sheets

(56) References Cited

U.S. PATENT DOCUMENTS

| | | | | |
|---|---|---|---|---|
| 5,665,919 A | * | 9/1997 | Woyski | G01M 7/06 73/665 |
| 2011/0239771 A1 | * | 10/2011 | Wu | G01M 7/06 73/663 |

* cited by examiner

VIBRATION GENERATOR

This application is a 371 application of PCT/JP2015/059642 having an international filing date of Mar. 27, 2015, which claims priority to JP2014-088382 filed Apr. 22, 2014, the entire contents of which are incorporated herein by reference.

TECHNICAL FIELD

The present invention relates in general to vibration generators used in vibration test systems and the like and in particular to fluid bearing structures for a slip table in such a vibration generator.

BACKGROUND ART

Various vibration generators have been used in conventional vibration testing and other like systems. These vibration generators may be used, for example, in vibration endurance testing conducted to verify that designed and fabricated products (e.g., automobile parts, electronic components, and aircraft parts) can exhibit expected performance in high vibration environments and also in transport and packing testing in which the products are subjected, before being shipped out, to vibration that the products are likely to experience during transport to verify that the products as such can be safely transported.

Many different types of vibration generators have been developed so far: unbalance mass types that produce vibration by a centrifugal force generated by an eccentric mass (weight) coupled to a rotating motor, hydraulic types using a piston, and cam types built around a cam mechanism. There are also electrodynamic vibration generators that utilize an electromagnetic effect (so-called "Fleming's left-hand rule") that a force acts on a conductor existing in a magnetic field when an electric current flows through the conductor. To briefly explain the operating principles of the electrodynamic vibration generator, a gap is provided in a cylindrical magnetic path, and a drive coil is suspended in the gap by springs so that the coil does not contact the gap. When a DC current flows through an exciting coil in the magnetic path, a magnetic flux is generated, and a DC magnetic field crossing the drive coil at right angles is generated in the gap. A vibration table produces vibration when an AC current flows through the drive coil.

Some fluid-bearing type vibration testers are proposed that include a vibration generator in which a slip table is sustained by externally supplying a pressurized fluid such as oil (see, for example, Patent Document 1). A fluid-bearing type vibration tester supports a slip table without contact, hence exhibits high vibration precision and low frictional wear, and therefore allows extended product life.

CITATION LIST

Patent Document

Patent Document 1: JP 3260756 B

DISCLOSURE OF THE INVENTION

Technical Problem

The vibration tester disclosed in Patent Document 1 however includes a vibrating table placed on a structure constructed as a combination of individual units connected via piping. This configuration is inevitably complex and hence costly.

Accordingly, the present invention has an object of providing a vibration generator that has a simple fluid bearing structure for a slip table and is therefore inexpensive.

Solution to Problem (1) The present invention is directed to a vibration generator vibrating a vibration target, the vibration generator including: a slip table to which the vibration target is attached; a base plate provided under the slip table, the base plate including a first base plate structural element and a second base plate structural element adjacent to the first base plate structural element in a vertical cross-sectional view of the base plate; and a flow-passage-forming element provided between the first base plate structural element and the second base plate structural element, the flow-passage-forming element including a flow passage in which a fluid flows, the flow passage in the flow-passage-forming element including a vertical flow passage and a horizontal flow passage, the vertical flow passage supplying the fluid to bottom faces of the first base plate structural element and the second base plate structural element, the horizontal flow passage supplying the fluid to a side face of the first base plate structural element and a side face of the second base plate structural element opposite the side face of the first base plate structural element. The present invention is applicable to various vibration generators including electrodynamic vibration generators, unbalance mass types of vibration generators, hydraulic types of vibration generators using a piston, and cam types of vibration generators built around a cam mechanism.

According to the configuration described in (1) above, a base plate is provided under a slip table. A vibration generator in accordance with the present invention, in a vertical cross-sectional view of the base plate, includes a region including a first base plate structural element and a second base plate structural element. The first base plate structural element has each side face thereof adjacent to a side face of a different base plate structural element. The second base plate structural element has a side face adjacent to one of the side faces of the first base plate structural element and a side face adjacent to one of side faces of another base plate structural element. A flow-passage-forming element is provided between the first base plate structural element and the second base plate structural element. The flow-passage-forming element includes a flow passage in which a fluid such as oil flows. This flow passage includes a vertical flow passage and a horizontal flow passage. The vertical flow passage supplies the fluid to bottom faces of the first base plate structural element and the second base plate structural element. The horizontal flow passage supplies the fluid to one of the side faces of the first base plate structural element and one of the side faces of the second base plate structural element opposite this one of the side faces of the first base plate structural element. In such a configuration, the fluid delivered via the vertical flow passage is supplied to the aforementioned bottom faces of the first base plate structural element and the second base plate structural element, thereby stably supporting the first base plate structural element and the second base plate structural element in a heightwise direction thereof. In addition, the fluid delivered via the horizontal flow passage is supplied to the aforementioned side faces of the first base plate structural element and the second base plate structural element, thereby stably supporting the first base plate structural element and the second base plate structural element in a widthwise direction thereof. In this manner, the configuration reduces vertical and widthwise vibrations of the first base plate structural element and the second base plate structural element. Thus, when the slip table is supported by the fluid supplied from the base plate, the positions of the first base plate structural element and the second base plate structural element relative to the slip table become stable, which improves precision in the first base plate structural element and the second base plate structural element supporting the slip table. Furthermore, the flow-passage-forming element including the vertical flow passage and the horizontal flow passage is manufactured in the form of a manifold integral to the single base plate. This configuration can remarkably simplify a fluid bearing structure for the slip table over the conventional vibration generator that includes a plurality of base plates constructed as individual units. The configuration therefore allows for low-cost vibration generators.

(2) The present invention is also directed to a vibration generator vibrating a vibration target, the vibration generator including: a slip table to which the vibration target is attached; a base plate provided under the slip table, the base plate including a plurality of base plate structural elements in a vertical cross-sectional view of the base plate, wherein, in the vertical cross-sectional view, the base plate includes a region including a first base plate structural element and a second base plate structural element, the first base plate structural element having each side face thereof adjacent to a side face of a different one of the base plate structural elements, the second base plate structural element having a side face adjacent to one of the side faces of the first base plate structural element and a side face adjacent to one of side faces of another one of the base plate structural elements; and a first flow-passage-forming element provided between the first base plate structural element and the second base plate structural element, the first flow-passage-forming element including a flow passage in which a fluid flows, the flow passage in the first flow-passage-forming element including a first vertical flow passage and a horizontal flow passage, the first vertical flow passage supplying the fluid to bottom faces of the first base plate structural element and the second base plate structural element, the horizontal flow passage supplying the fluid to one of the side faces of the first base plate structural element and one of the side faces of the second base plate structural element opposite this one of the side faces of the first base plate structural element.

According to the configuration described in (2) above, a base plate is provided under a slip table. Another vibration generator in accordance with the present invention, in a vertical cross-sectional view of the base plate, includes a region including a first base plate structural element and a second base plate structural element. The first base plate structural element has each side face thereof adjacent to a side face of a different base plate structural element. The second base plate structural element has a side face adjacent to one of the side faces of the first base plate structural element and a side face adjacent to one of side faces of another base plate structural element. A first flow-passage-forming element is provided between the first base plate structural element and the second base plate structural element. The first flow-passage-forming element includes a flow passage in which a fluid such as oil flows. This flow passage includes a first vertical flow passage and a horizontal flow passage. The first vertical flow passage supplies the fluid to bottom faces of the first base plate structural element and the second base plate structural element. The horizontal flow passage supplies the fluid to one of the side faces of the first base plate structural element and one of the side faces of the second base plate structural element opposite this one of the side faces of the first base plate structural element. In such a configuration, the fluid delivered via the first vertical flow passage is supplied to the aforementioned bottom faces of the first base plate structural element and the second base plate structural element, thereby stably supporting the first base plate structural element and the second base plate structural element in a heightwise direction thereof. In addition, the fluid delivered via the horizontal flow passage is supplied to the aforementioned side faces of the first base plate structural element and the second base plate structural element, thereby stably supporting the first base plate structural element and the second base plate structural element in a widthwise direction thereof. In this manner, the configuration reduces vertical and widthwise vibrations of the first base plate structural element and the second base plate structural element. Thus, when the slip table is supported by the fluid supplied from the base plate, the positions of the first base plate structural element and the second base plate structural element relative to the slip table become stable, which improves precision in the first base plate structural element and the second base plate structural element supporting the slip table. Furthermore, the first flow-passage-forming element including the first vertical flow passage and the horizontal flow passage is manufactured in the form of a manifold integral to the single base plate. This configuration can remarkably simplify a fluid bearing structure for the slip table over the conventional vibration generator that includes a plurality of base plates constructed as individual units. The configuration therefore allows for low-cost vibration generators.

(3) The vibration generator described in (2) above is preferably such that in the vertical cross-sectional view, the base plate includes a region including a third base plate structural element having one of side faces thereof adjacent to a side face of another one of the base plate structural elements, the vibration generator further including a second flow-passage-forming element between the third base plate structural element and either the first base plate structural element or the second base plate structural element, the second flow-passage-forming element including a second vertical flow passage supplying the fluid to a bottom face of the third base plate structural element and the bottom face of the first base plate structural element or the second base plate structural element.

According to the configuration described in (3) above, the vibration generator in accordance with the present invention includes, in the vertical cross-sectional view of the base plate, a region including a third base plate structural element having only one of side faces thereof adjacent to a side face of another one of the base plate structural elements. A second flow-passage-forming element is provided between the third base plate structural element and either the first base plate structural element or the second base plate structural element. The second flow-passage-forming element includes a second vertical flow passage supplying the fluid to a bottom face of the third base plate structural element and the bottom face of the first base plate structural element or the second base plate structural element. A negligible vibrating force acts in the widthwise direction (in the top view of the slip table) when compared with the vibrating force acting in the vibrating direction (lengthwise direction in the top view of the slip table). In view of this, the third base plate structural element does not need to be supported by the fluid delivered via the horizontal flow passage. As a result, the second flow-passage-forming element only needs to be separated from the base plate structural elements by a small gap so as to allow the inserting of the second flow-passage-forming element. This configuration can simplify the fluid bearing structure and obviate the need for high precision positioning in the case where horizontal flow passages are provided. The configuration therefore allows for further cost reduction.

(4) In any of the vibration generators described in (1) to (3) above, the base plate preferably includes a fluid flow passage supplying the fluid to a bottom face of the slip table.

According to the configuration described in (4) above, the fluid is supplied to a bottom face of the slip table via the fluid flow passage. Therefore, the slip table can be stably supported by an oil film. This configuration hence reduces vertical vibrations of the slip table.

(5) In the vibration generator described in (4) above, the base plate preferably has a top face on which there is formed a plurality of distribution grooves configured to distribute on the base plate the fluid ejected from the fluid flow passage.

According to the configuration described in (5) above, the fluid delivered via the fluid flow passage is distributed on the base plate by a plurality of distribution grooves. This configuration can hence form a large oil film under the bottom face of the slip table, thereby stably supporting the slip table.

(6) In either of the vibration generators described in (4) and (5) above, the base plate preferably has a top face on which there is formed a plurality of collecting grooves configured to collect the fluid ejected from the fluid flow passage.

According to the configuration described in (6) above, the fluid ejected from the fluid flow passage can be collected by the plurality of collecting grooves. The configuration hence enables recycling of the collected fluid, thereby reducing running costs.

DETAILED DESCRIPTION OF THE PREFERRED EMBODIMENTS

The following will describe a vibration generator in accordance with an embodiment of the present invention in reference to FIGS. 1 to 8. The description will assume, as an example, that the vibration generator in accordance with the present invention is an electrodynamic vibration generator.

Figure 1:
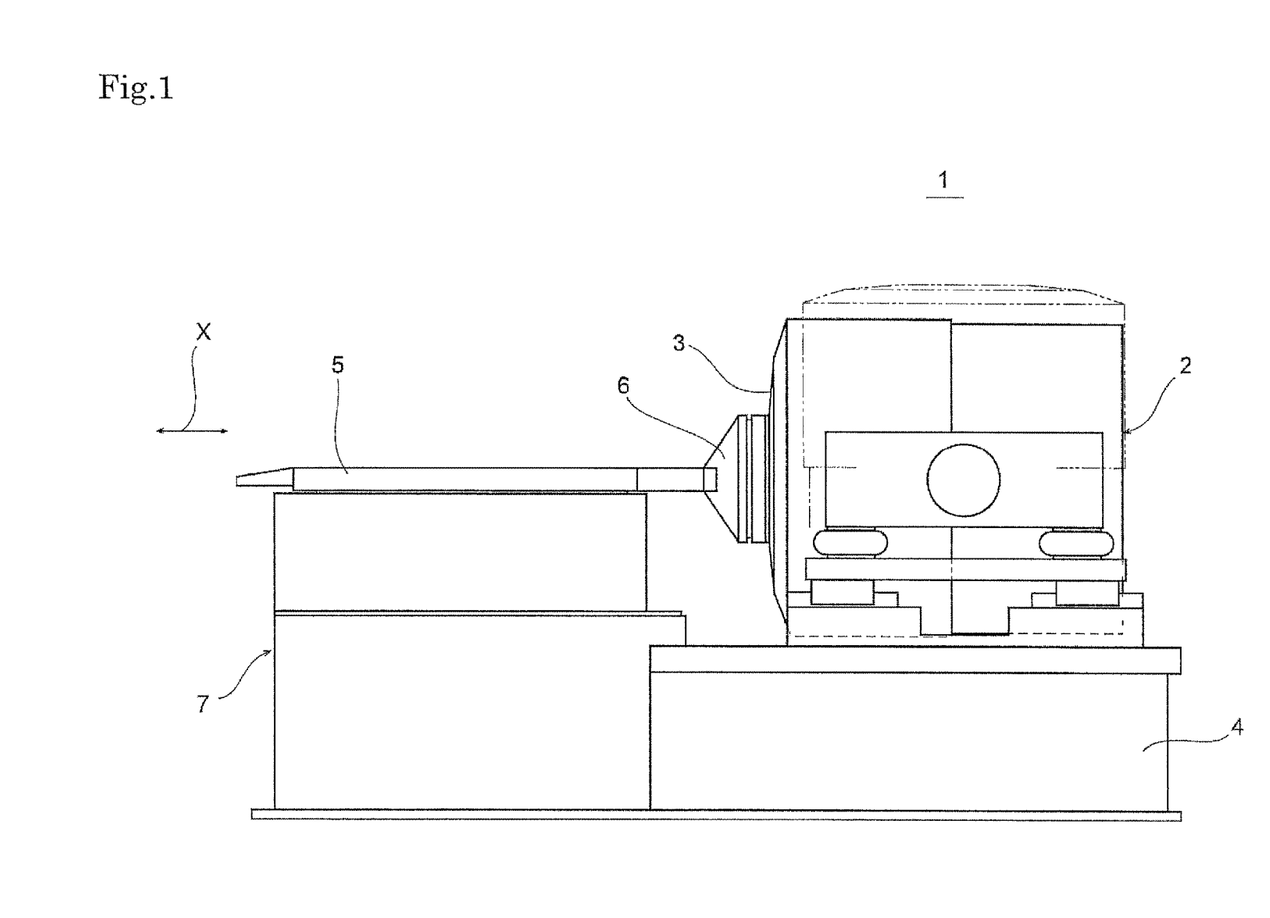
FIG. 1 is a front view of a configuration of an entire vibration generator in accordance with the present embodiment.

A vibration generator 1 in accordance with the present embodiment is capable of producing horizontal vibrations, as well as producing vertical vibrations. FIG. 1 shows the vibration generator 1 being set up so that the vibration generator 1 can produce horizontal vibrations. The vibration generator 1 can produce vertical vibrations when a yoke (described later in detail) is rotated clockwise by 90°.

Referring to FIG. 1, the vibration generator 1 primarily includes a yoke 2, a vibration platform 3, a foundation 4 sustaining the yoke 2, a slip table 5, a coupling section 6 coupling the slip table 5 and the vibration platform 3, and an oil recycling section 7 provided under the slip table 5. The yoke 2 may be suitably made of magnetic materials with high permeability and high mechanical strength including low carbon steels such as SS400. The vibration platform 3 may be suitably made of non-magnetic metals with high mechanical strength such as aluminum alloys or synthetic resins such as carbon fiber. Arrow X in FIG. 1 indicates vibrating directions.

The yoke 2 includes an exciting coil (not shown) for generating a static magnetic field in the yoke 2 and a drive coil (not shown) for generating vibrations. The drive coil is placed inside a magnetic gap and formed integral to the vibration platform 3. When a DC current flows through the exciting coil, a magnetic circuit (static magnetic field) is produced in the yoke 2 around the exciting coil. When an AC current with a predetermined frequency flows through the drive coil, a force is generated between the static magnetic field generated in the magnetic gap and the AC current flowing through the drive coil. This force vibrates the drive coil in directions perpendicular to the magnetic flux. The vibration of the drive coil in turn vibrates the vibration platform 3, and hence a vibration target attached to the slip table 5, at the frequency of the AC current flowing through the drive coil.

Figure 2:
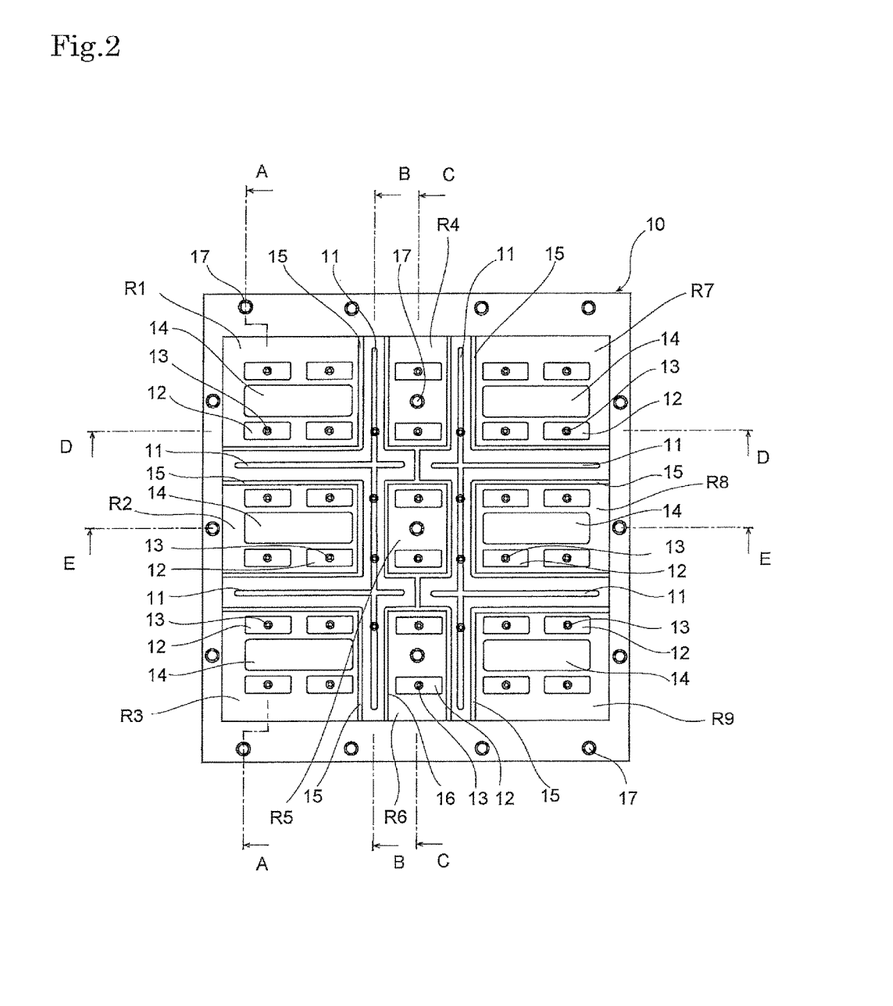
FIG. 2 is a top view of a configuration of a base plate provided under a slip table shown in FIG. 1.
Figure 3A:
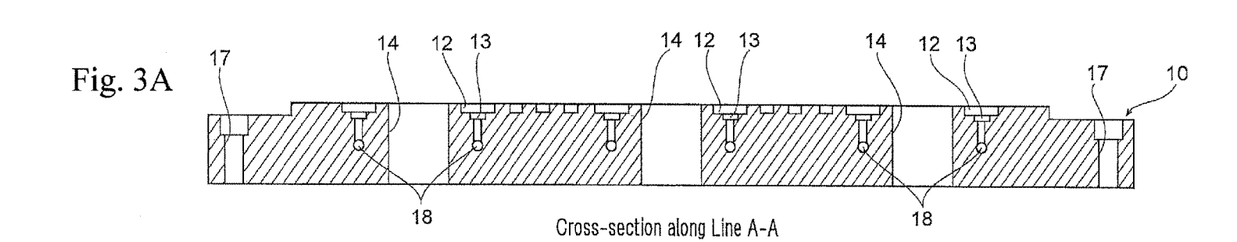
FIGS. 3A, 3B, and 3C are cross-sectional views of the base plate shown in FIG. 2 taken along lines A-A, B-B, and C-C respectively.
Figures 3B, 3C:
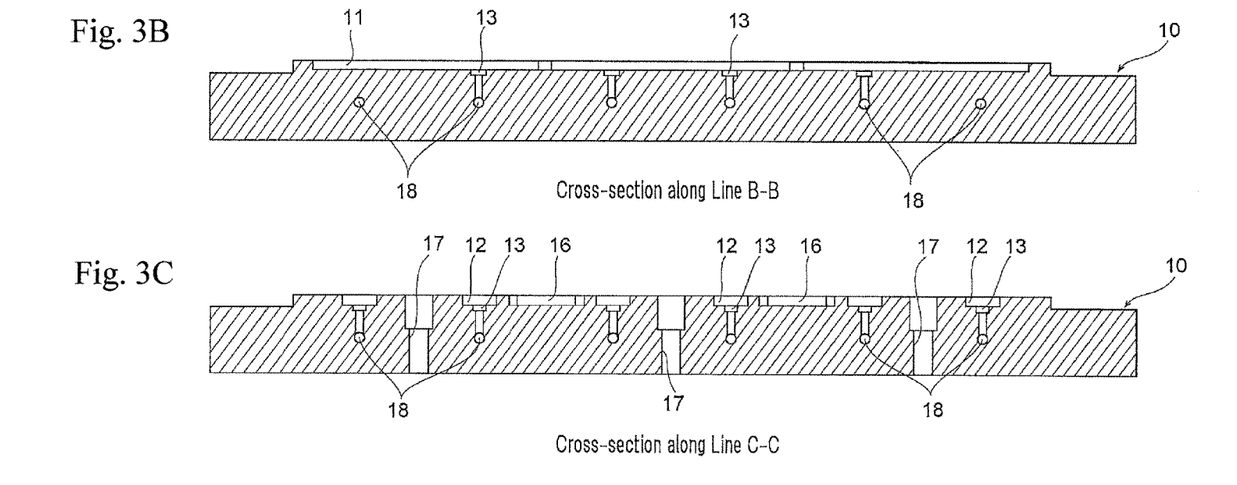
Figure 4A:
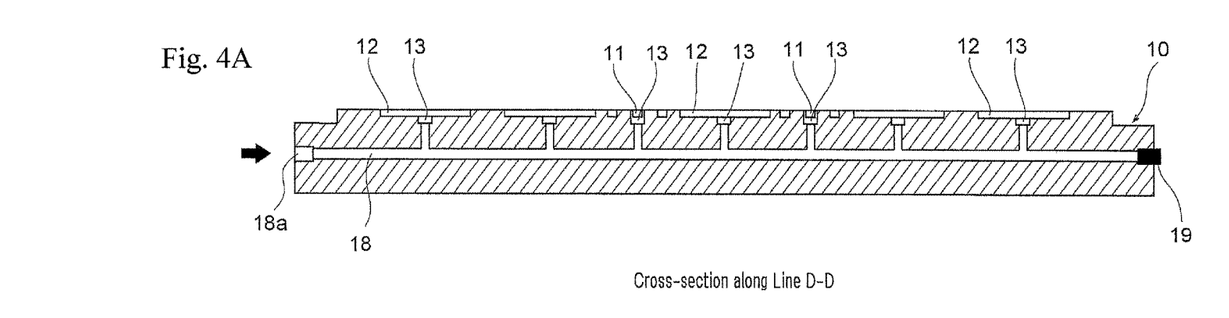
FIGS. 4A and 4B are cross-sectional views of the base plate shown in FIG. 2 taken along lines D-D and E-E respectively.
Figure 4B:
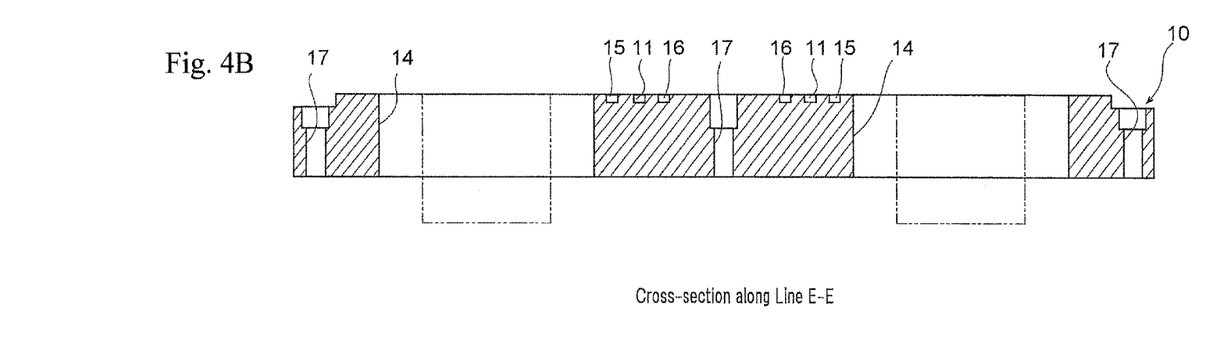

FIG. 2 is a top view of a configuration of a base plate provided under the slip table 5 shown in FIG. 1. FIGS. 3A, 3B, and 3C are cross-sectional views of the base plate shown in FIG. 2 taken along lines A-A, B-B, and C-C respectively. FIGS. 4A and 4B are cross-sectional views of the base plate shown in FIG. 2 taken along lines D-D and E-E respectively.

The present invention employs a "fluid bearing system" in which a fluid (e.g., oil; the following description assumes that the fluid is oil) is supplied from a base plate 10 to a bottom face of the slip table 5 so as to form, between the slip table 5 and the base plate 10, an oil film supporting the slip table 5.

As illustrated in FIG. 2, the base plate 10 includes distribution grooves 11 to distribute oil on the base plate 10, for example, two in the lengthwise direction and two in the widthwise direction. Each of the two lengthwise extending distribution grooves 11 is cut in the middle. The four distribution grooves 11 thus divide the base plate 10 into nine horizontal regions, which are referred to as regions R1 to R9 for convenience. The base plate 10 may be divided into any number of regions other than nine by increasing or decreasing the number of the distribution grooves 11, depending on the size of the base plate 10.

There are provided pockets 12 and ejection holes 13 in each region R1 to R9 of the base plate 10. Each ejection hole 13 is located inside a corresponding one of the pockets 12 to eject oil. In regions R1 to R3 and R7 to R9 of the base plate 10, there is provided an element hole 14 between each pair of the pockets 12 that are adjacent in the widthwise direction of the base plate 10. A flow-passage-forming element is inserted into the element hole 14 as will be described later in detail. Referring to FIG. 3A, oil is supplied through fluid flow passages 18 to the ejection holes 13 and the pockets 12. The fluid flow passages 18 are formed in the lengthwise direction in FIG. 2. As illustrated in FIG. 4A, there is provided an oil inlet port 18a at a starting end of each fluid flow passage 18 and an oil plug 19 at a terminating end thereof.

There is also provided a collecting groove 15 in each region R1 to R3 and R7 to R9 of the base plate 10 in such a manner that both the starting and terminating ends thereof can reach a peripheral edge of the base plate 10. In contrast, there is provided a collecting groove 16 across regions R4 to R6 in such a manner that both the starting and terminating ends thereof can reach a peripheral edge of the base plate 10. The collecting grooves 15 and 16 are intended to collect oil and flow it to the oil recycling section 7 (FIG. 1). There are provided fastening holes 17 along the peripheral edges and the widthwise extending centerline of the base plate 10.

Figure 5:
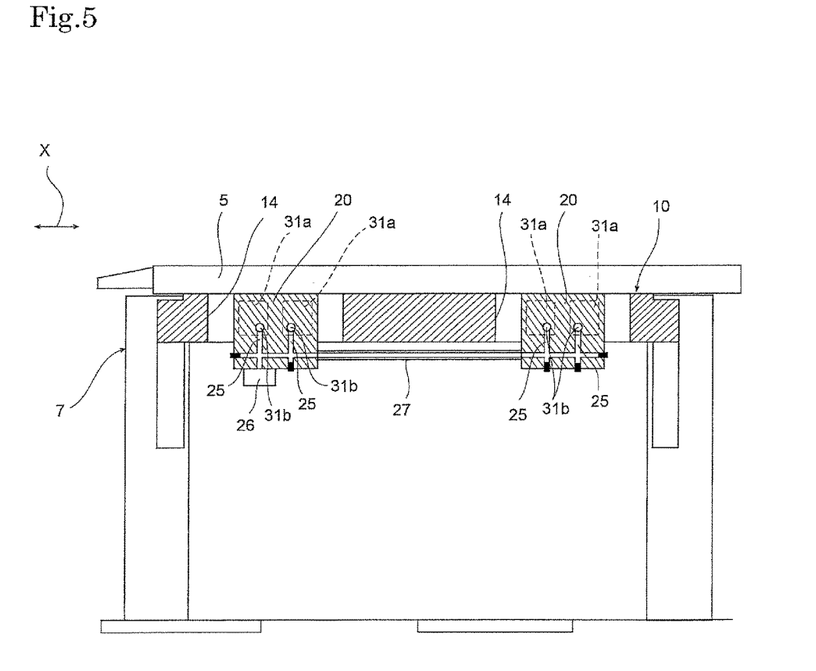
FIG. 5 is a partial vertical cross-sectional view of the base plate sustained in an upper part of an oil recycling section.
Figure 6:
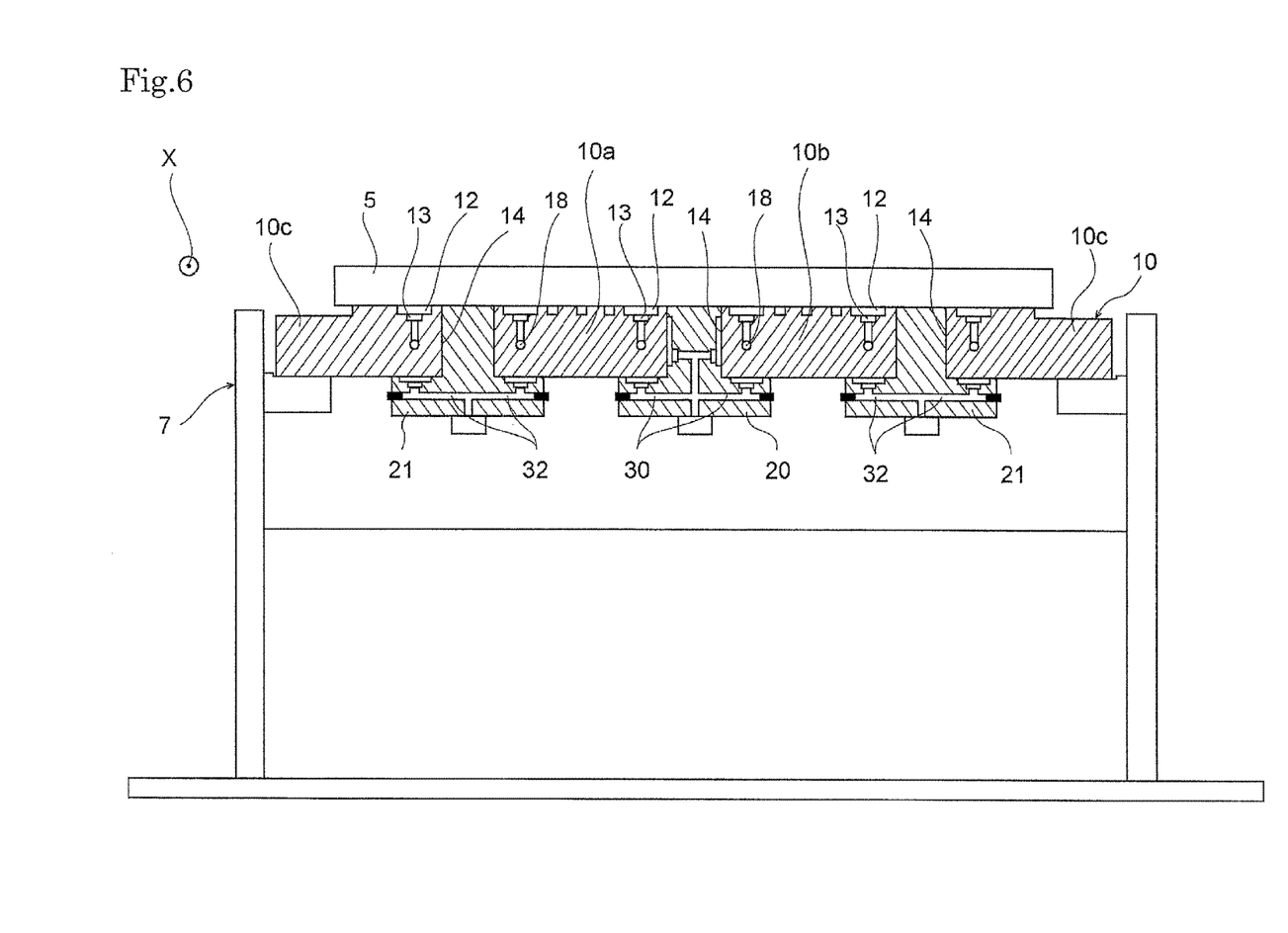
FIG. 6 is another partial vertical cross-sectional view of the base plate sustained in the upper part of the oil recycling section.
Figure 7:
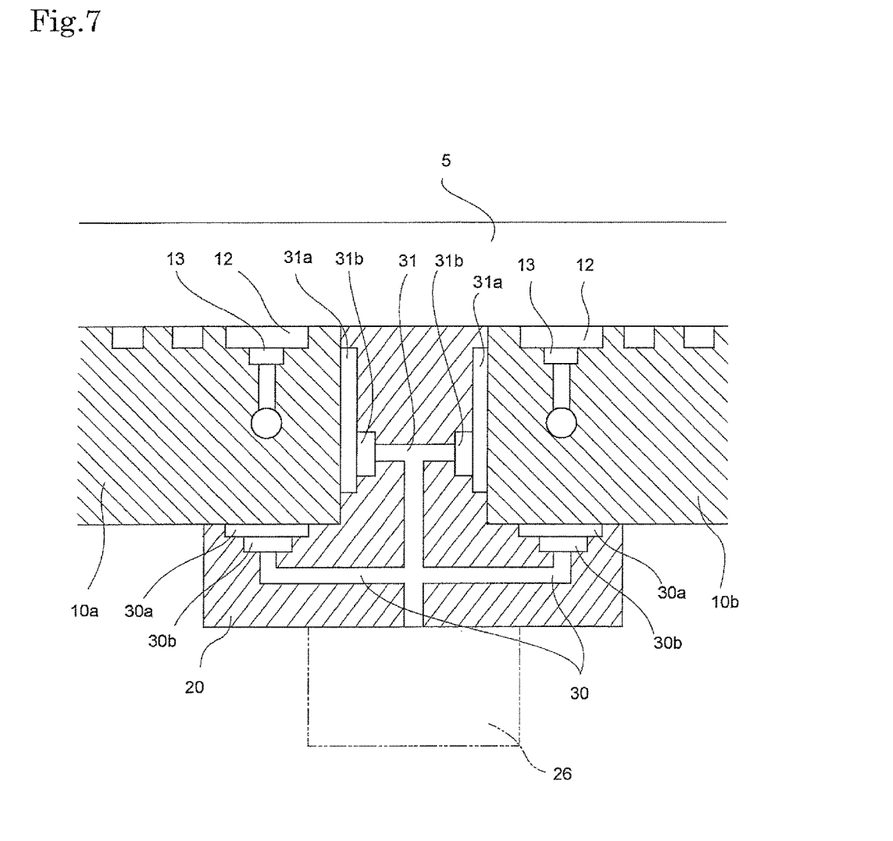
FIG. 7 is an enlarged view of a major part shown in FIG. 6.

FIGS. 5 and 6 are partial vertical cross-sectional views of the base plate 10 sustained in an upper part of the oil recycling section 7. FIG. 7 is an enlarged view of a major part shown in FIG. 6. Note that FIG. 5 is a vertical cross-sectional view of the base plate 10 shown in FIG. 2 taken in the lengthwise direction across regions R2, R5, and R8 and also that FIG. 6 is a vertical cross-sectional view of the base plate 10 shown in FIG. 2 taken in the widthwise direction across regions R1, R2, and R3.

Referring to FIG. 5, first flow-passage-forming elements 20 are inserted into the element holes 14. Each first flow-passage-forming element 20 has a top part thereof fixed to the slip table 5. Inside the first flow-passage-forming element 20 are there formed fluid flow passages 25 in communication with ejection holes 31b. The ejection holes 31b are in communication with pockets 31a (details will be given later). Still referring to FIG. 5, the fluid flow passages 25 in the left-hand first flow-passage-forming element 20 are connected to an inlet section 26 for delivering oil from the oil recycling section 7. The fluid flow passages 25 in the left-hand first flow-passage-forming element 20 and the fluid flow passages 25 in the right-hand first flow-passage-forming element 20 are connected via a fluid flow passage 27.

Referring to FIG. 6, the base plate 10, when viewed in a vertical cross-sectional view, includes a first base plate structural element 10a, a second base plate structural element 10b, and two third base plate structural elements 10c, 10c. The first base plate structural element 10a has each side face thereof adjacent to a side face of a different base plate structural element (in this figure, the second base plate structural element 10b and one of the third base plate structural elements 10c). The second base plate structural element 10b has a side face adjacent to one of the side faces of the first base plate structural element 10a and a side face adjacent to one of side faces of another base plate structural element (in this figure, one of the third base plate structural elements 10c).

The first flow-passage-forming element 20 is disposed between these first and second base plate structural elements 10a and 10b. The first flow-passage-forming element 20, as illustrated in FIG. 7, includes a first vertical flow passage 30 and a horizontal flow passage 31. The first vertical flow passage 30 supplies oil to a bottom face of the first base plate structural element 10a and a bottom face of the second base plate structural element 10b. The horizontal flow passage 31 supplies oil to one of the side faces of the first base plate structural element 10a and a side face of the second base plate structural element 10b opposite this one of the side faces of the first base plate structural element 10a. The first vertical flow passage 30 has downstream ends thereof in communication with ejection holes 30b that are in turn in communication with pockets 30a. The horizontal flow passage 31 has downstream ends thereof in communication with the ejection holes 31b (which are in turn in communication with the pockets 31a). In such a configuration, the oil delivered via the first vertical flow passage 30 is ejected vertically from the ejection holes 30b to form oil films in the pockets 30a. These oil films stably support the first base plate structural element 10a and the second base plate structural element 10b in a heightwise direction thereof. In addition, the oil delivered via the horizontal flow passage 31 is ejected horizontally from the ejection holes 31b to form oil films in the pockets 31a. These oil films stably support the first base plate structural element 10a and the second base plate structural element 10b in a widthwise direction thereof. In this manner, the configuration reduces vertical and widthwise vibrations of the first base plate structural element 10a and the second base plate structural element 10b. Thus, the positions of the first base plate structural element 10a and the second base plate structural element 10b relative to the slip table 5 become stable, which improves precision in the first base plate structural element 10a and the second base plate structural element 10b supporting the slip table 5. Oil is ejected at a pressure of, for example, 6 MPa to 7 MPa from the first vertical flow passage 30 and the horizontal flow passage 31. The oil ejected vertically from a left-hand and a right-hand second flow-passage-forming element 21 in FIG. 6 has the same effects as the oil ejected vertically from the first flow-passage-forming element 20.

The first flow-passage-forming elements 20 each including the first vertical flow passage 30 and the horizontal flow passage 31 may be manufactured in the form of a manifold integral to the single base plate 10. This configuration can remarkably simplify the fluid bearing structure over the conventional vibration generator that includes a plurality of base plates constructed as individual units. The configuration therefore allows for low-cost vibration generators.

Referring back to FIG. 6, the second flow-passage-forming elements 21 are provided between the third base plate structural elements 10c and the first and second base plate structural elements 10a and 10b. Each second flow-passage-forming element 21 includes a second vertical flow passage 32 that supplies oil to a bottom face of the third base plate structural element 10c and the aforementioned bottom face of the first or second base plate structural element 10a or 10b. The fluid delivered via the second vertical flow passages 32 is supplied to these bottom faces of the third base plate structural elements 10c, the first base plate structural element 10a, and the second base plate structural element 10b to form oil films. These oil films stably support the first base plate structural element 10a, the second base plate structural element 10b, and the third base plate structural elements 10c in a heightwise direction thereof. In addition, a negligible vibrating force acts in the widthwise direction (in the top view of the slip table 5) when compared with the vibrating force acting in vibrating direction X (lengthwise direction in the top view of the slip table 5). In view of this, the second flow-passage-forming elements 21 do not need to be supported widthwise by the first, second, and third base plate structural elements 10a, 10b, and 10c. As a result, the second flow-passage-forming elements 21 only need to be separated from the first, second, and third base plate structural elements 10a, 10b, and 10c by a small gap so as to allow the inserting of the second flow-passage-forming elements 21. This configuration can simplify the fluid bearing structure and obviate the need for high precision positioning in the case where horizontal flow passages are provided. The configuration therefore allows for further cost reduction.

Figure 8:
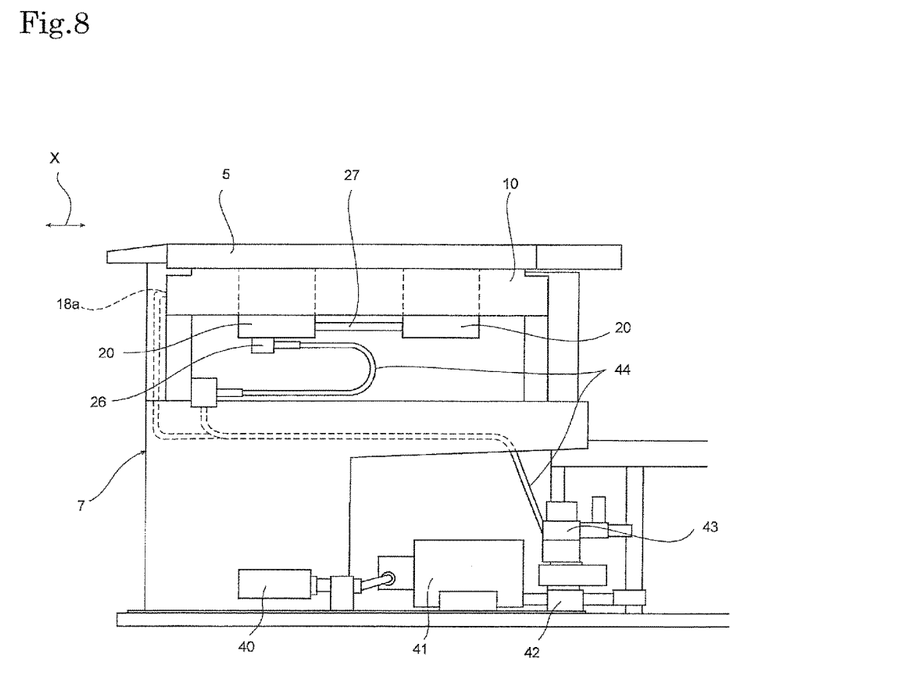
FIG. 8 is a schematic view of a configuration of the oil recycling section.

FIG. 8 is a schematic view of a configuration of the oil recycling section 7. The present invention is capable of recycling the oil used to achieve the fluid bearing function. More specifically, the oil recycling section 7, as illustrated in FIG. 8, includes a suction filter 40, a pump 41, a relief valve 42, a switching valve 43, a tubular flow passage 44 connected to, for example, the inlet section 26 and the oil inlet port 18a for the base plate 10, and an oil tank (not shown) where oil falling from the base plate 10 is collected. In such a configuration, the oil collected in the oil tank, after being filtered through the suction filter 40, is pumped up by the pump 41, passed through the relief valve 42 and the switching valve 43, and delivered via the tubular flow passage 44 to the inlet section 26.

The present invention has been described so far by way of an embodiment in reference to drawings. Specific arrangements should by no means be limited to this embodiment. The scope of the present invention is defined only by the claims and never bound by the description of the embodiment. Those modifications and variations that may lead to equivalents of claimed elements are all included within the scope of the invention. Therefore, the embodiment may be modified as in the following, without departing from the scope of the present invention.

The base plate 10 is divided into nine regions R1 to R9 in the above-described embodiment. The present invention is by no means limited to this arrangement. Alternatively, the base plate 10 may be divided into 8 or fewer regions or 10 or more regions. The following will, in reference to FIGS. 9 to 11, describe variation examples of the above embodiment in which the base plate includes a single region (the base plate is in actuality not divided at all) and is divided into 2 and 15 regions.

Variation Example 1: Base Plate Includes Single Region

Figure 9:
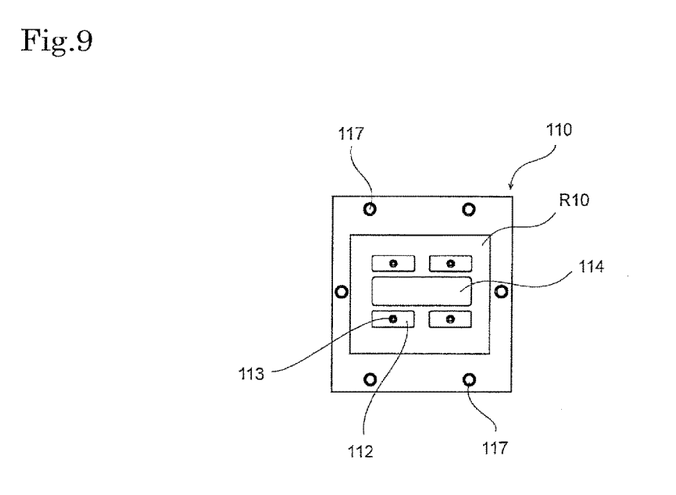
FIG. 9 is a top view of a configuration of variation example 1 of the base plate shown in FIG. 2.

Referring to FIG. 9, a base plate 110 in accordance with the present variation example includes only one region R10 (the base plate 110 is in actuality not divided at all) and has no collecting grooves for collecting oil and flowing it to an oil recycling section (not shown). On the base plate 110 is there provided a slip table (not shown) slightly smaller than the base plate 110. A first flow-passage-forming element (not shown) similar to those in the above-described embodiment is inserted in an element hole 114. The first flow-passage-forming element (not shown) has a top part thereof fixed to the slip table (not shown). Reference numerals 112, 113, 114, and 117 indicate the same members as reference numerals 12, 13, 14, and 17 respectively in the above-described embodiment, and detailed description of these members is omitted for this reason. The other members for a vibration generator in accordance with the present variation example are configured as in the above-described embodiment, but may be changed in size and shape in a suitable manner depending on the size and shape of the base plate 110. The vibration generator in accordance with the present variation example, including the base plate 110, is capable of achieving functions and effects similar to those achieved by the vibration generator 1 in accordance with the above-described embodiment.

Variation Example 2: Base Plate is Divided into Two Regions

Figure 10:
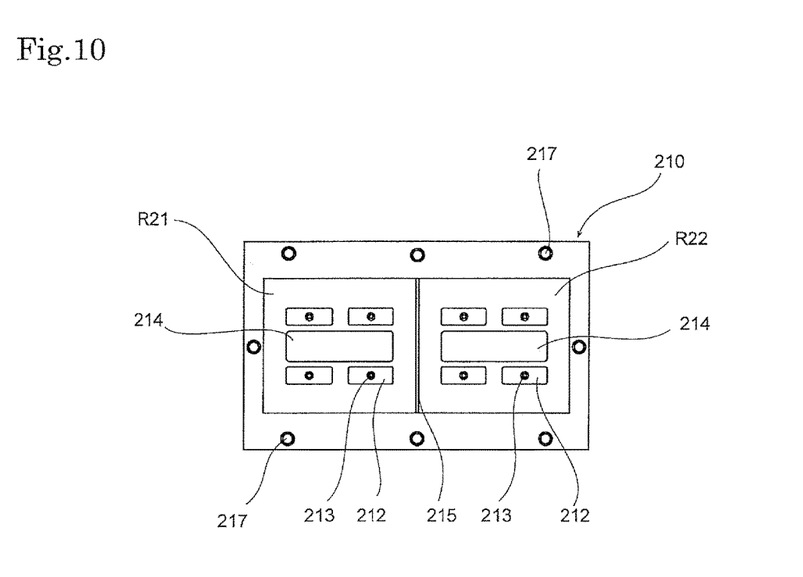
FIG. 10 is a top view of a configuration of variation example 2 of the base plate shown in FIG. 2.

Referring to FIG. 10, a base plate 210 in accordance with the present variation example is divided into regions R21 and R22. On the base plate 210 is there provided a slip table (not shown) slightly smaller than the base plate 210. A first flow-passage-forming element (not shown) similar to those in the above-described embodiment is inserted in each element hole 214. The first flow-passage-forming element (not shown) has a top part thereof fixed to the slip table (not shown). Reference numerals 212, 213, 214, 215, and 217 indicate the same members as reference numerals 12, 13, 14, 15, and 17 respectively in the above-described embodiment, and detailed description of these members is omitted for this reason. The other members for a vibration generator in accordance with the present variation example are configured as in the above-described embodiment, but may be changed in size and shape in a suitable manner depending on the size and shape of the base plate 210. The vibration generator in accordance with the present variation example, including the base plate 210, is capable of achieving functions and effects similar to those achieved by the vibration generator 1 in accordance with the above-described embodiment.

Variation Example 3: Base Plate is Divided into 15 Regions

Figure 11:
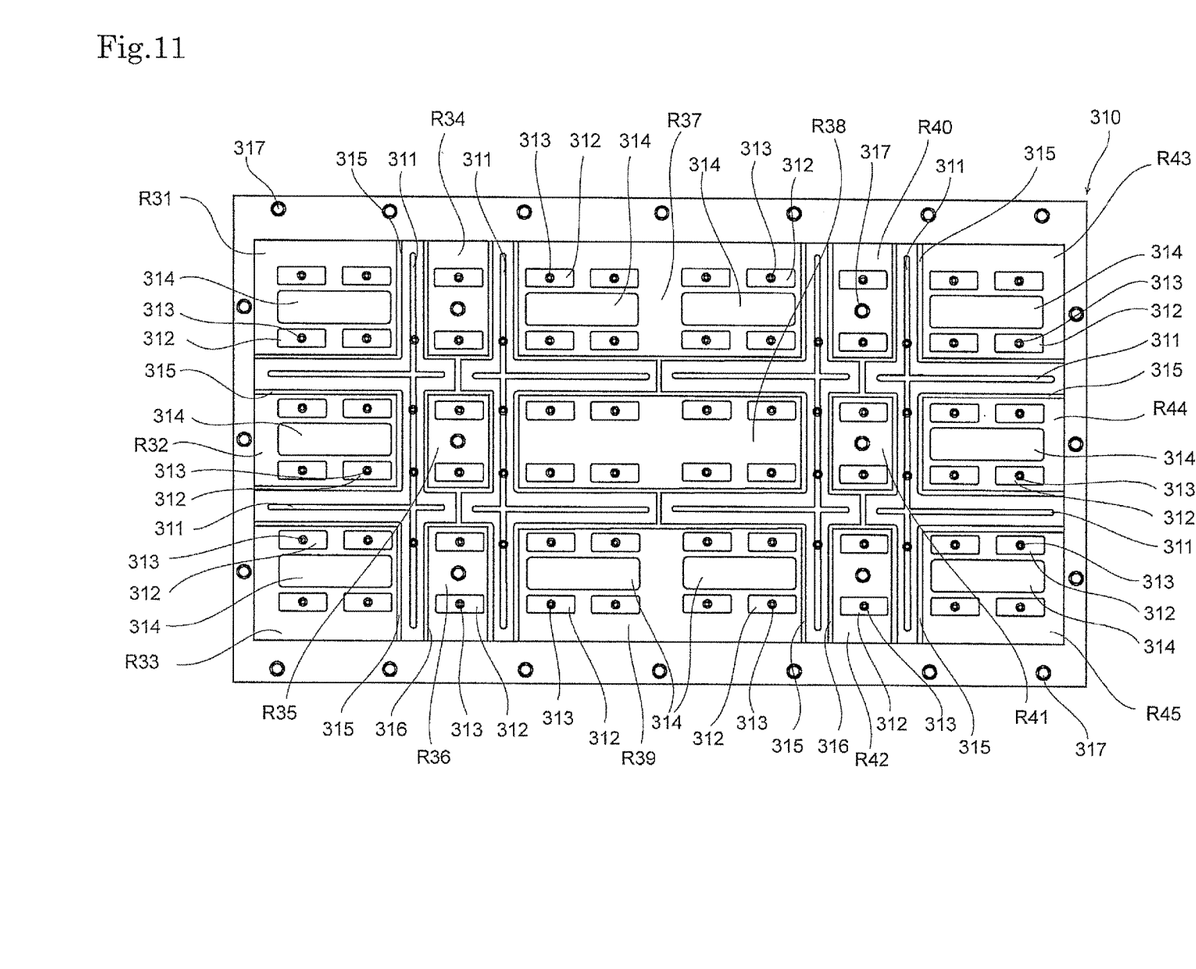
FIG. 11 is a top view of a configuration of variation example 3 of the base plate shown in FIG. 2.

Referring to FIG. 11, a base plate 310 in accordance with the present variation example is divided into regions R31 to R45. On the base plate 310 is there provided a slip table (not shown) slightly smaller than the base plate 310. A first flow-passage-forming element (not shown) similar to those in the above-described embodiment is inserted in each element hole 314 in regions R32 and R44. The first flow-passage-forming element (not shown) has a top part thereof fixed to the slip table (not shown). A second flow-passage-forming element (not shown) similar to those in the above-described embodiment is inserted in each element hole 314 in regions R31, R33, R37, R39, R43, and R45. The second flow-passage-forming element (not shown) has a top part thereof fixed to the slip table (not shown). Regions R34 to R36 and R40 to R42 are configured similarly to regions 4 to 6 of the base plate 10 in the above-described embodiment. Reference numerals 311 to 317 indicate the same members as reference numerals 11 to 17 respectively in the above-described embodiment, and detailed description of these members is omitted for this reason. The other members for a vibration generator in accordance with the present variation example are configured as in the above-described embodiment, but may be changed in size and shape in a suitable manner depending on the size and shape of the base plate 310. The vibration generator in accordance with the present variation example, including the base plate 310, is capable of achieving functions and effects similar to those achieved by the vibration generator 1 in accordance with the above-described embodiment.

INDUSTRIAL APPLICABILITY

The vibration generator in accordance with the present invention can be suitably used in vibration testing of in-vehicle devices and components and other various devices and components.

What is claimed is:

1. A vibration generator configured to vibrate a vibration target, comprising:
   a horizontally arranged vibrating slip table to which the vibration target is attached;
   a horizontally arranged base plate provided to a bottom face of the slip table; the base plate comprising a first base plate structural element provided to the bottom face of the slip table and a second base plate structural element provided to the bottom face of the slip table and arranged horizontally adjacent to the first base plate structural element; and
   a flow-passage-forming element provided between the first base plate structural element and the second base plate structural element, the flow-passage-forming element including a flow passage in which a fluid flows, wherein
   the flow passage in the flow-passage-forming element comprises a vertical flow passage and a horizontal flow passage, the vertical flow passage configured to supply the fluid into the first base plate structural element and the second base plate structural element from bottom faces of the first base plate structural element and the second base plate structural element, the horizontal flow passage configured to supply the fluid into the first base plate structural element and the second base plate structural element from opposing side face of the first base plate structural element and the second base plate structural element.

2. The vibration generator according to claim 1, wherein the base plate includes fluid flow passages running, respectively, through the first and second base plate structural elements and configured to supply the fluid to the bottom face of the slip table.

3. The vibration generator according to claim 2, wherein the base plate has a top face formed with a plurality of distribution grooves therein configured to distribute, between the base plate and the slip table, the fluid ejected to the bottom face of the slip table from the fluid flow passages.

4. The vibration generator according to claim 3, wherein the base plate has the top face formed with a plurality of collecting grooves therein configured to collect the fluid ejected to the bottom face of the slit table from the fluid flow passages.

5. The vibration generator according to claim 2, wherein the base plate has a top face formed with a plurality of collecting grooves therein configured to collect the fluid ejected between the base plate and the slip table from the fluid flow passage.

6. A vibration generator configured to vibrate a vibration target, comprising:
   a horizontally arranged vibrating slip table to which the vibration target is attached,
   a horizontally arranged base plate provided to a bottom face the slip table, the base plate comprising a plurality of base plate structural elements provided to the bottom face of the slip table and arranged horizontally adjacent to each other, wherein the plurality of base plate structural elements includes a first base plate structural element, a second base plate structural element and a third base plate structural element, the first base plate structural element being arranged horizontally adjacent to the second base plate structural element, and one of the first base plate structural element or the second base plate structural element being arranged horizontally adjacent to and between the third base plate structural element and the other of the first base plate structural element or the second base plate structural element; and
   a first flow-passage-forming element provided between the first base plate structural element and the second base plate structural element, the first flow-passage-forming element including a flow passage in which a fluid flows, wherein
   the flow passage in the first flow-passage-forming element comprises a first vertical flow passage and a horizontal flow passage, the first vertical flow passage configured to supply the fluid into the first base plate structural element and the second base plate structural element from bottom faces of the first base plate structural element and the second base plate structural element, the horizontal flow passage configured to supply the fluid into the first base plate structural element and the second base plate structural element from opposing the side faces of the first base plate structural element and the second base plate structural element.

7. The vibration generator according to claim 6, further comprising a second flow-passage-forming element provided between the third base plate structural element and one of the first base plate structural element or the second base plate structural element, wherein the second flow-passage-forming element comprises a second vertical flow passage configured to supply the fluid into the third base plate structural element and said one of the first base plate structural element or the second base plate structural element from bottom faces of the third base plate structural element and said one of the first base plate structural element or the second base plate structural element.

8. The vibration generator according to claim 7, wherein the base plate includes fluid flow passages running, respectively, through the plurality of base plate structural elements and configured to supply the fluid to the bottom face of the slip table.

9. The vibration generator according to claim 8, wherein the base plate has a top face formed with a plurality of distribution grooves therein configured to distribute, between the base plate and the slip table, the fluid ejected from the fluid flow passages to the bottom face of the slit table.

10. The vibration generator according to claim 9, wherein the base plate has the top face formed with a plurality of collecting grooves therein configured to collect the fluid ejected to the bottom face of the slit table from the fluid flow passages.

11. The vibration generator according to claim 8, wherein the base plate has a top face formed with a plurality of collecting grooves therein configured to collect the fluid ejected to the bottom face of the slit table from the fluid flow passages.

12. The vibration generator according to claim 6, wherein the base plate includes fluid flow passages running, respectively, through the plurality of base plate structural elements and configured to supply the fluid to the bottom face of the slip table.

13. The vibration generator according to claim 12, wherein the base plate has a top face formed with a plurality of distribution grooves therein configured to distribute, between the base plate and the slip table, the fluid ejected from the fluid flow passages to the bottom face of the slit table.

14. The vibration generator according to claim 13, wherein the base plate has the top face formed with a plurality of collecting grooves therein configured to collect the fluid ejected to the bottom face of the slit table from the fluid flow passages.

15. The vibration generator according to claim 12, wherein the base plate has a top face formed with a plurality of collecting grooves therein configured to collect the fluid ejected between the base plate and the slip table from the fluid flow passages.

* * * * *

UNITED STATES PATENT AND TRADEMARK OFFICE
CERTIFICATE OF CORRECTION

PATENT NO. : 10,156,495 B2
APPLICATION NO. : 15/305897
DATED : December 18, 2018
INVENTOR(S) : Hidenao Aoki et al.

It is certified that error appears in the above-identified patent and that said Letters Patent is hereby corrected as shown below:

In the Claims

In Column 11, Claim 5, Line 55, delete "passage" and replace with -- passages --.

Signed and Sealed this
Fourteenth Day of April, 2020

Andrei Iancu
*Director of the United States Patent and Trademark Office*